May 31, 1932. E. E. WEMP 1,861,253
CLUTCH CONSTRUCTION FOR AUTOMOTIVE VEHICLES
Filed Sept. 23, 1929    5 Sheets-Sheet 2
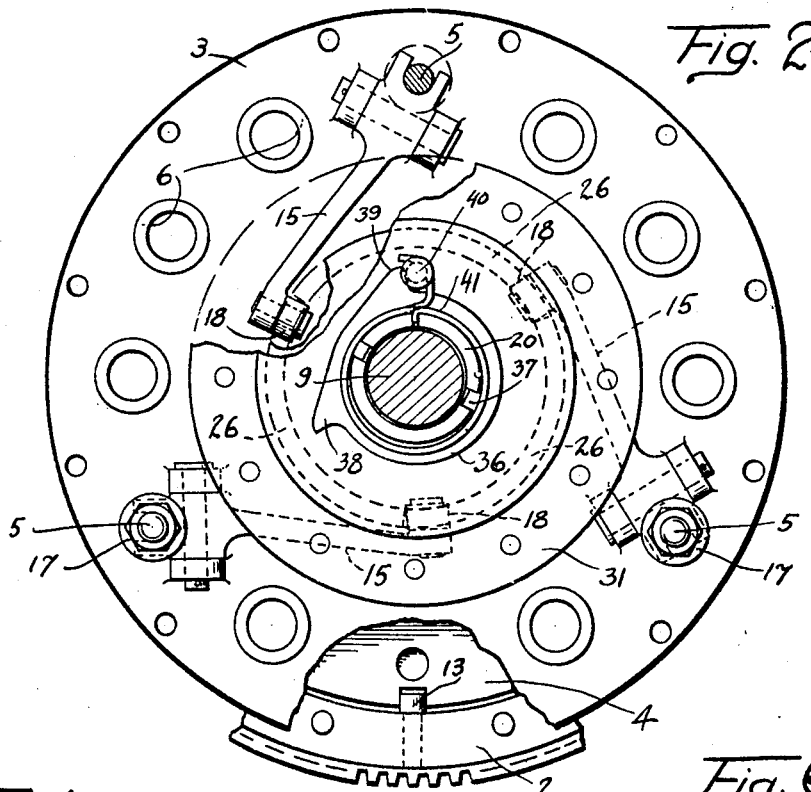
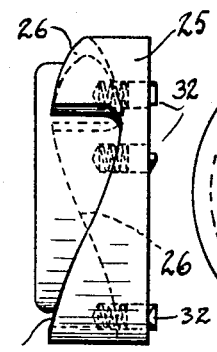
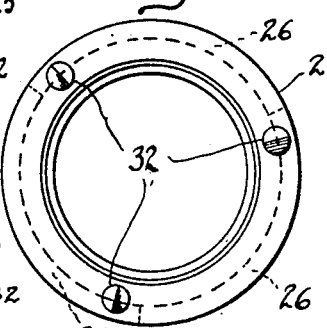
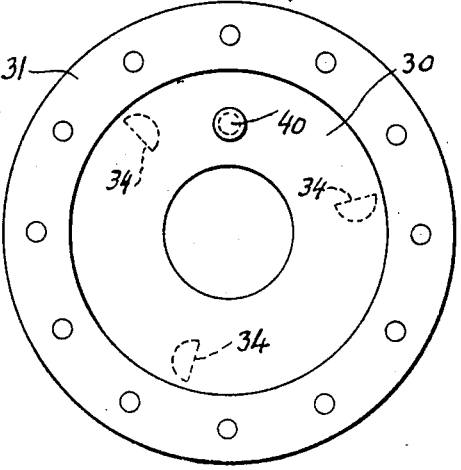
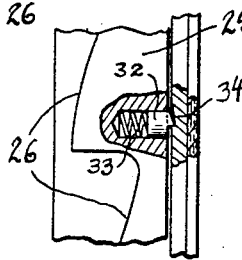
INVENTOR.
Ernest E. Wemp
BY
ATTORNEY.

May 31, 1932.  E. E. WEMP  1,861,253
CLUTCH CONSTRUCTION FOR AUTOMOTIVE VEHICLES
Filed Sept. 23, 1929  5 Sheets-Sheet 3
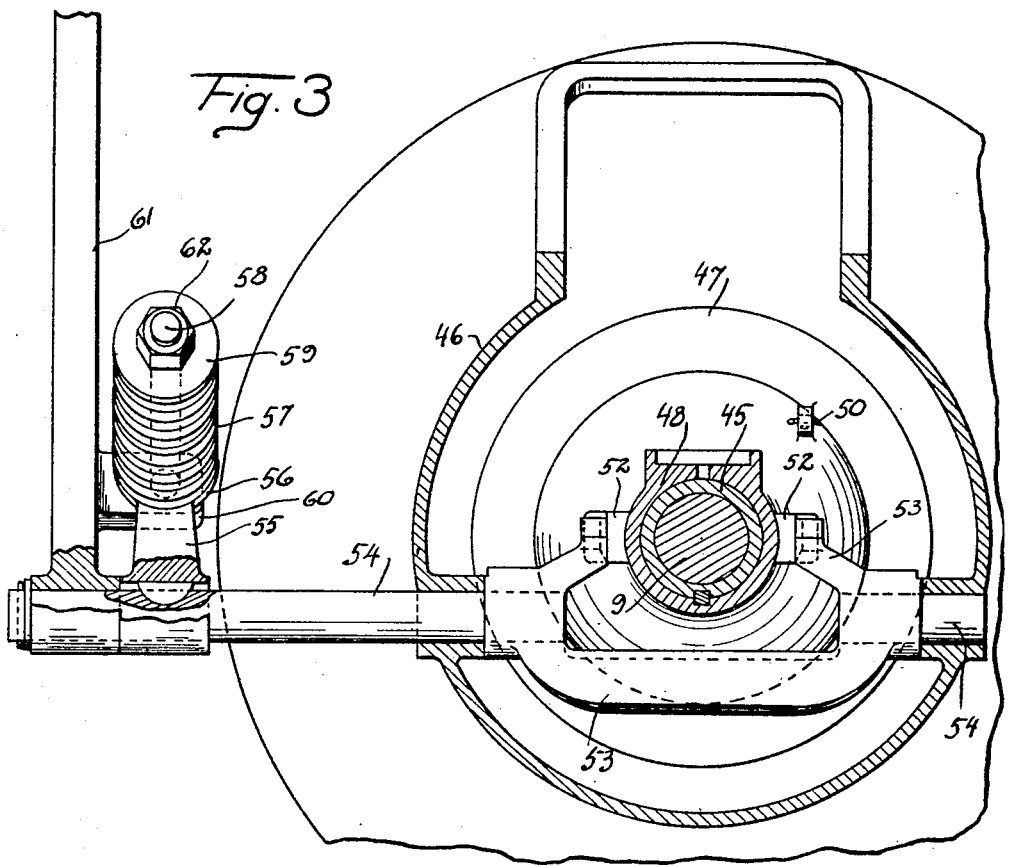
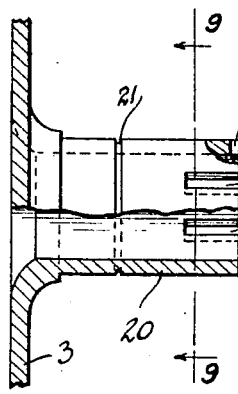
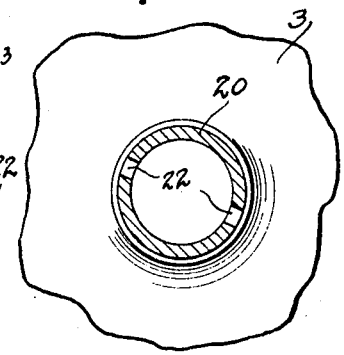
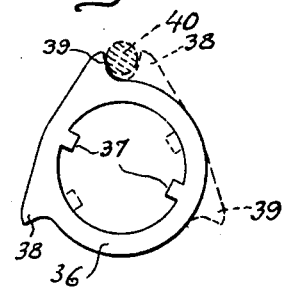
INVENTOR.
Ernest E. Wemp
BY
ATTORNEY.

May 31, 1932. E. E. WEMP 1,861,253
CLUTCH CONSTRUCTION FOR AUTOMOTIVE VEHICLES
Filed Sept. 23, 1929 5 Sheets-Sheet 4
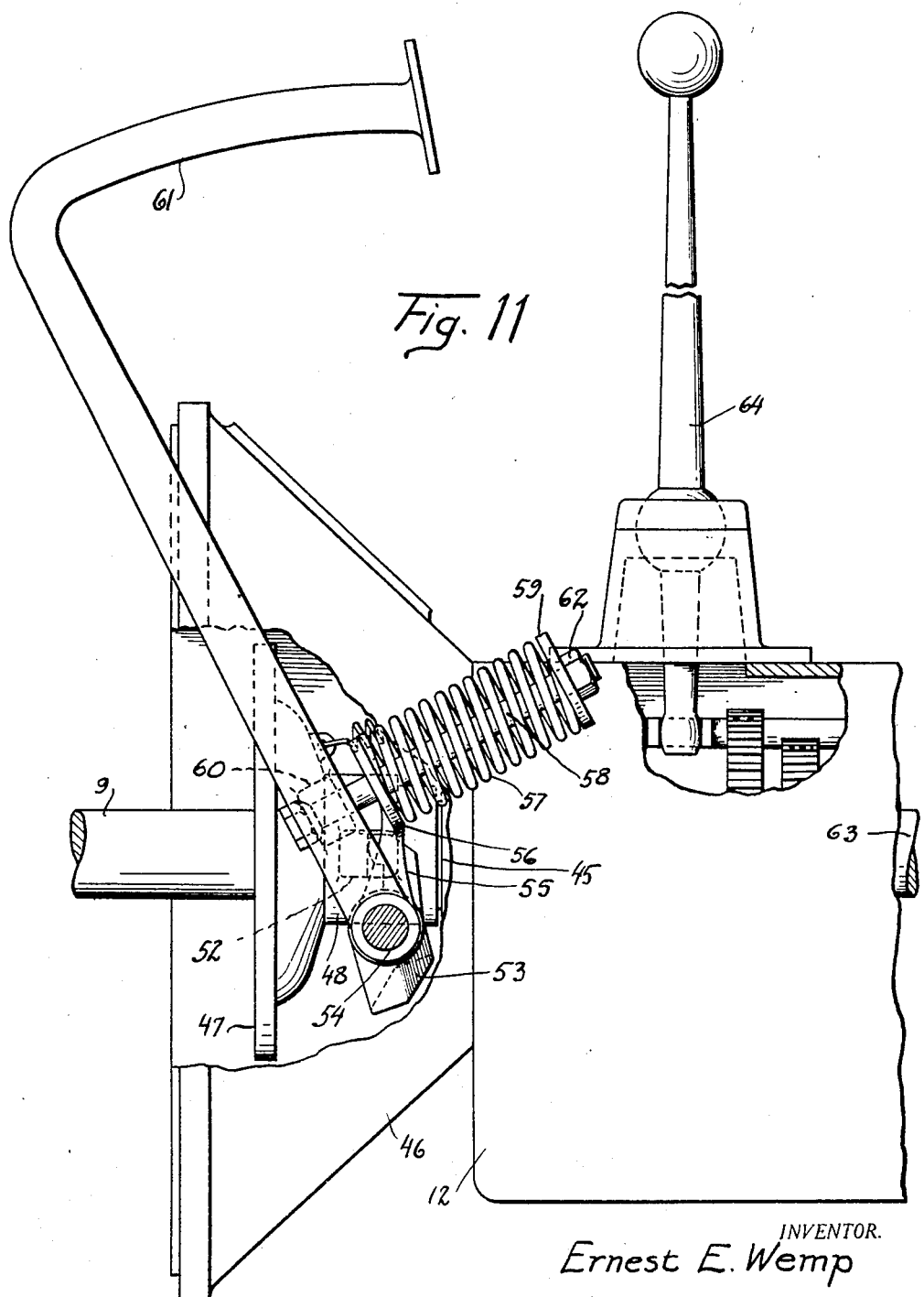
INVENTOR.
Ernest E. Wemp
BY
ATTORNEY.

May 31, 1932. E. E. WEMP 1,861,253
CLUTCH CONSTRUCTION FOR AUTOMOTIVE VEHICLES
Filed Sept. 23, 1929 5 Sheets-Sheet 5

INVENTOR.
Ernest E. Wemp
BY
ATTORNEY.

Patented May 31, 1932

1,861,253

UNITED STATES PATENT OFFICE

ERNEST E. WEMP, OF DETROIT, MICHIGAN

CLUTCH CONSTRUCTION FOR AUTOMOTIVE VEHICLES

Application filed September 23, 1929. Serial No. 394,426.

This invention relates to a clutch construction for automotive vehicles, and the invention is concerned principally with a mechanism employed in operating a clutch to engage and disengage the same in such manner that a number of new results are accomplished.

It is practically the universal practice in automotive vehicles to employ a transmission having shiftable gears which may be selected in order to effect a desired gear ratio between the engine and the traction wheels. In shifting gears, it is well known that the gears which are to be meshed together must be substantially synchronized as to speed of rotation in order to effect a nicety of action, and prevent clashing of the gear teeth. One method of doing this is by what is known as double clutching. This principle is understood by those skilled in the art, but it requires considerable skill on the part of the operator to perform this double clutching action. In explanation of what is meant, this example may be given: Assume an automotive vehicle is starting in low gear; the engine attains a relatively high speed while the traction wheels are yet turning relatively slowly; the clutch is disengaged for the purpose of shifting gears, and some of the gears in the transmission housing are turning fast due to having been connected to the engine, while others are turning slowly due to their direct connection with the traction wheels. The engine, of course, is decelerated at this moment, and after the gears are placed in neutral, the operator again engages the clutch, and the decelerated engine thus decelerates the fast turning gears in the transmission housing, so that all gears therein are more or less synchronized as to speed; the clutch is now disengaged for the second time, the gear shift effected, and the clutch again engaged and the automotive vehicle operated under its engine power through a different set of gears in the transmission. The reverse of this action may be made when an automotive vehicle has been allowed to coast down a hill in such manner as to synchronize the gears connected with the fast turning traction wheels with those gears which are turning slowly due to their operative association with the slow turning engine.

As above stated, this method of operation requires considerable skill on the part of the operator, and many persons who drive automotive vehicles not only do not have the skill to do this, but are not capable of understanding why the process should be done from a mechanical standpoint, or else do not care to be bothered with the mechanics of the same. Accordingly, the present invention contemplates in a clutch, a construction wherein this double clutching action is automatically accomplished so that in shifting gears, one need but depress the usual clutch pedal, as is the usual practice, and then automatically the double clutching action takes place, so that the shifting gears are substantially synchronized as to speed, and shifting thereof is more easily accomplished without the clashing of gears.

Another object of the invention is that of providing a clutch wherein the operating effort required of the driver may be made extremely light. The more expensive automobiles, having reference now particularly to passenger and pleasure cars, are usually large as compared to the cheaper cars, have large powerful engines, and it follows that clutches of heavy construction and with strong packing springs are required for use with such engines. As a result, the clutch is harder to operate than one in a small car. In the light cheap car, the clutch may be constructed so that it is not hard to operate, but in the large, heavy and expensive car, the clutches require more effort to operate. This is just the reverse of what one would expect, because in the large car ease of operation, ease of control, and other such niceties are expected, while as a matter of fact, at the present time a clutch in the small car may be constructed to operate with more ease than the large car. Accordingly, the present invention contemplates a construction wherein a very light pressure is required to actuate the clutch regardless of how heavy or how strong the packing springs are. To this end, the invention utilizes the torque of the automobile engine as a means of power for releasing the clutch, while the operator merely furnishes sufficient effort in reaction to the engine torque in such manner as to utilize the engine torque for the purpose.

A still further object of the invention is the provision of a clutch construction wherein the wear of the friction discs in the clutch is automatically compensated for in such manner that the foot pedal, or other instrument designed for manual operation to actuate the clutch, is not affected thereby. Accordingly, the foot lever may be given an initial adjustment at the factory, and this adjustment will be maintained throughout the life of the vehicle, even though there may be considerable wear of the clutch facings.

In explanation of this, it might be pointed out that in the usual clutch of today, the clutch pedal is depressed to disengage the clutch, but the same returns when pressure thereon is released and the clutch becomes engaged. As the friction discs wear away, the pedal is returned further toward the operator. It is the usual practice to provide a clearance for this action, which may be termed wear travel, or "lash", but when the wear becomes considerable, the pedal returns so far as to ride against the toeboards, thus to interfere with the engagement of the clutch and eventually cause it to slip. This condition may not be noticed by the ordinary operator, until the clutch facings have been damaged beyond repair. In the present clutch construction, this detrimental action cannot take place, with the result that the initial setting of the operating pedal is maintained substantially throughout the life of the car; there is, however, a slight tendency of wear travel in the direction opposite that above described. This, however, in no way interferes with the engagement of the clutch, and the reason for this wear travel will be better understood when the detail construction is pointed out.

In the accompanying drawings:

Fig. 2 is a section taken on line 2—2 of Fig. 1, with some of the parts cut away in order to depict underlying mechanism.

Fig. 3 is a section taken substantially on line 3—3 of Fig. 1, showing the pedal and associated clutch actuating parts.

Fig. 4 is a side elevation of the clutch controlling element, which is in the form of a cam.

Fig. 5 is a face view thereof.

Fig. 6 is a face view of what may be termed a friction plate, by means of which the torque of the engine may be utilized for actuating the clutch.

Fig. 7 is a detail view partly in section, illustrating the manner of interengagement between the clutch controlling cam element and friction plate.

Fig. 8 is a detail illustrating the sleeve construction associated with the clutch housing.

Fig. 9 is a section taken on line 9—9 of Fig. 8.

Fig. 10 is a view illustrating in detail an operating part, which may be termed a limit plate which is associated with the friction plate to control the movements thereof.

Fig. 11 is a side elevation of a clutch and transmission housing showing the foot pedal arrangement.

Figure 1:
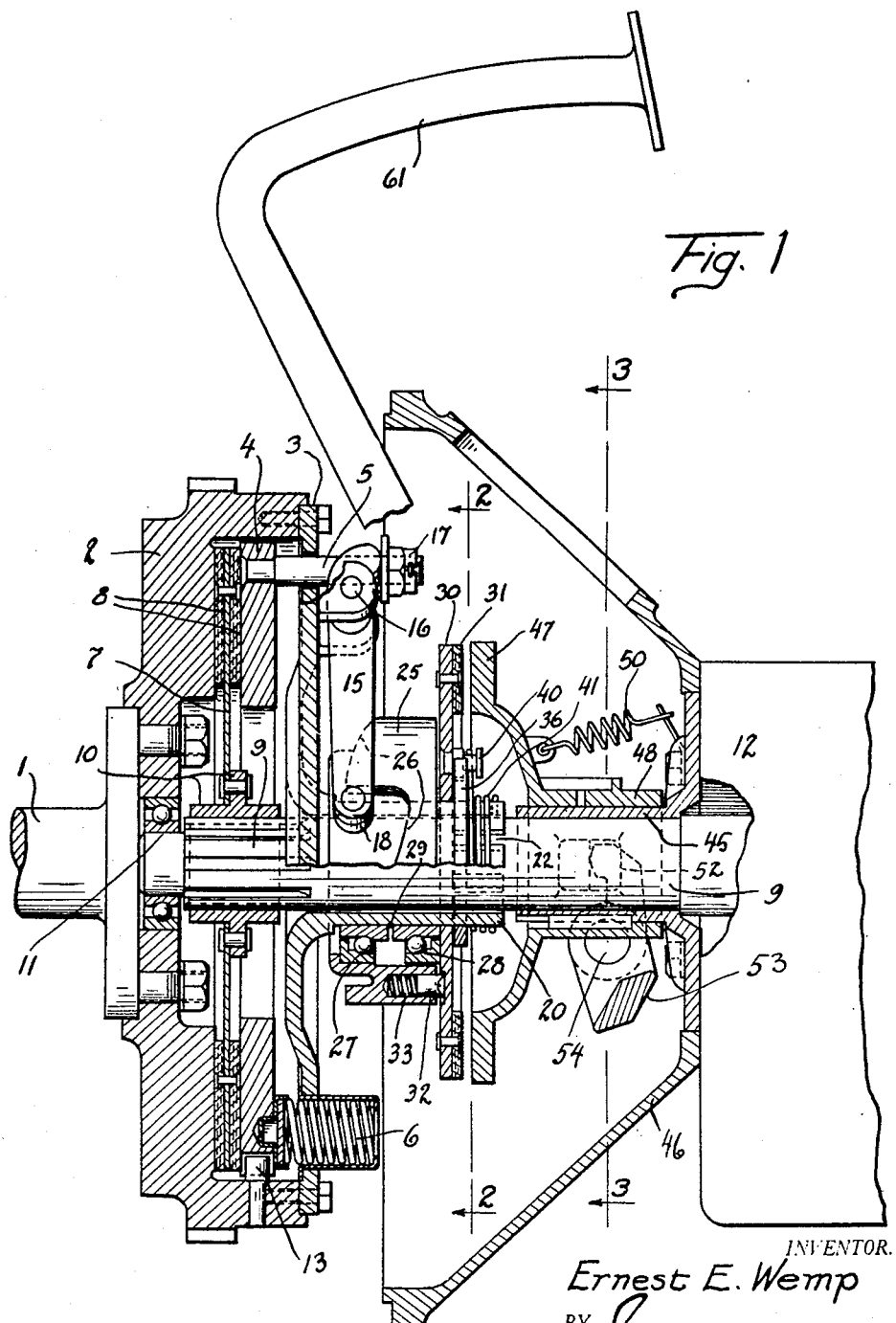
Fig. 1 is a sectional view taken through a clutch constructed in accordance with the invention, and illustrating the clutch operating mechanism.

The drawings herewith illustrate the end of an engine crank shaft as at 1, with fly-wheel 2 attached thereto. The clutch construction is associated with the fly-wheel and comprises a cover plate 3, bolted to the fly-wheel, and a pressure plate 4 carried by pins 5, and capable of axial movement. Packing springs 6 act upon the pressure plate so that a driven disc 7, having clutch facings 8, is engaged by the faces of the fly-wheel and pressure plate. The driven disc is splined to a shaft, which may be termed the driven shaft 9, by means of a hub 10. This driven shaft is journaled at one end as at 11, while its other end extends into a housing for the transmission gears, as illustrated at 12. The pressure plate 4 is driven with the fly-wheel, as by means of driving pins 13. The clutch thus described, is one which embodies a single driven disc, and is otherwise more or less conventional, but it is within the spirit of this invention that the clutch per se may vary in form, as the invention resides particularly in the operation thereof and mechanism for performing the operation.

It will be understood that the packing springs pack the pressure plate 4 against the driven disc in order that the shaft 9 be driven; the clutch may be released by retracting the pressure plate against the action of the pressure springs, and this may be accomplished by a number of releasing levers 15, pivoted on the cover plate as at 16, and arranged to engage a nut, or the like, 17 on the pins 5 (Fig. 2). For the purpose of releasing the clutch, control mechanism is provided for rocking these levers 15 on their pivotal mounting, the direction of which is, as viewed in Fig. 1, clockwise.

For this purpose, the cover plate 3 is provided with a sleeve 20, as shown in detail in Fig. 8, the same being provided with a groove 21 and opposite slots 22, and also an aperture 23. The purpose of these various formations in the sleeve will be understood when the associated structure is described. The shaft 9 extends through the sleeve, but there is preferably a clearance as regards the sleeve and shaft, so that there is no bearing action.

Rotatably mounted on the sleeve is a controlling cam element 25, provided with cam faces 26, adapted to engage the adjacent end of levers 15 and rock the same; for this purpose, the levers may be provided with rollers 18. These cam faces are arranged preferably to effect a rather gradual lift of the levers, and for providing a very quick return, as will be appreciated by noticing the shape of these cam elements. An advantageous construction employs three clutch releasing levers 15 (Fig. 2), and preferably, there are the same number of cam faces 26 (Fig. 4). This controlling cam element is carried by a thrust bearing 27. Another bearing 28 is provided, and the two are separated as by means of a wire ring 29, situated in the groove 21.

It will be understood that if this cam element is rotated relative to the clutch releasing levers in a direction which causes the rollers 18 to ride up the cam faces 26, that the levers 15 will be rocked in such manner as to retract the pressure plate 4. For accomplishing this action, a friction plate 30 is provided, and it preferably has facing material 31. This friction plate is associated with the cam element through the means of plungers 32, backed up each by a spring 33, and advantageously the plungers are three in number. The friction plate is provided with notches preferably three in number (Fig. 6), as indicated by the reference characters 34, and these notches and the plungers are so designed that relative movement between the friction plate and cam element is prevented in one direction, but permitted in the opposite direction, at which time the plungers may move out of, and over the notches with a ratchet-like action. This will be appreciated by reference to Fig. 7.

The friction plate 30 is mounted for rotation relative to the sleeve 20, but its movement relative to the sleeve is limited. For this purpose, what may be termed a limit plate 36 is utilized, and this plate has keys 37, which fit into the slots 22 in the sleeve so that the sleeve and limit plate rotate together. This limit plate has stop ears 38 and 39. A suitable pin, or the like, 40 projects from the friction plate 30, and a coil spring 41 establishes a resilient connection between the sleeve 20 and friction plate 30. This is effected by the securing of one end of the spring in the aperture 23 of the sleeve, and by hooking the other end of the spring over the pin 40.

The construction thus far described, is capable of accomplishing the double clutching action when a reactive force is applied to the friction plate 30. The application of this reactive force is accomplished by a means later to be described. It may be advisable at this time, however, to point out, having reference to Fig. 1, that all the parts thus far described rotate together in substantial unison during the operation of the clutch, and while the same is engaged. As shown in Fig. 1, the clutch is engaged, and accordingly, the fly-wheel and the cover plate attached thereto, with its sleeve 20, the controlling cam element 25, and the friction plate 30, are all rotating together. The clutch is disengaged, however, upon interference with this uniform rotation, and this is accomplished by decelerating the friction plate 30. The details of the operation will, however, be brought out as the manually controlled pedal and associated parts are described.

There is provided a sleeve 45 which may be carried by the transmission case 12, or if desired, by the clutch housing 46, and mounted for reciprocation on the sleeve is a control plate 47 having a hub 48 slidably fitting over the sleeve 45. This control plate is normally held retracted away from the friction plate, as by means of a spring 50, and this control plate, while being capable of axial movement relative to the sleeve 45, yet is prevented from rotation.

The plate is provided with bosses 52 (Fig. 3), arranged to receive the ends of a yoke 53, mounted on a rock shaft 54, which is journaled in the housing 46. Keyed to the rock shaft 54 is an arm 55, having a spring seat 56 (Fig. 11). A coil spring 57 rests upon this spring seat, and a bolt 58 extends through a spring retainer 59, the spring, the spring seat 56, and through an apertured lug 60 on a foot pedal 61. The foot pedal is freely rotatable on the rock shaft. The desired tension of spring 57 may be obtained by adjusting nut 62. This completes the description of the mechanism, except it will be noted that in Fig. 11 the ultimate driving shaft, which extends to the traction wheels, is shown at 63, and the gear shifting lever at 64.

The operation is as follows: Assume that the automotive vehicle is traveling along a highway, and the parts illustrated in Fig. 1, are substantially in the position shown in that figure, with the clutch and associated parts rotating. The friction plate 30 and cam element 25, it will be understood, rotate uniformly with the clutch. To disengage the clutch the operator depresses the pedal 61. This rocks the shaft 54 under a compressive action of spring 57, as the movement is transmitted to the arm 55, through bolt 58 and spring 57. This rocks the yoke, which slides the control plate 47 forwardly, or in a direction to the left, as viewed in Fig. 1. As soon as the control plate contacts with the facing 31, there is a tendency to decelerate the friction plate 30. This action is more or less determined by the spring 57, as an operator may depress the pedal 61 different degrees.

In looking at the construction from the right-hand side of Fig. 1, the clutch is rotating counter-clockwise, and when the braking action is applied to the friction disc, its rotary movement is slowed up so that it has what may be termed a clockwise deceleration. In other words, the friction plate now is given rotation relative to the clutch proper, which is in a clockwise direction. Bearing 28 takes the thrust. Due to the spring-pressed plungers 32, the controlling cam element is carried with the friction plate. Accordingly, the cam faces 26 ride under the rollers 18, rock the levers 15, and disengage the clutch.

However, the clutch is again engaged automatically, and this is permitted as follows: The relative movement between the friction plate and the clutch proper is limited to substantially 240°; this is depicted in Fig. 10, wherein the pin 40 will be seen positioned up against the ear 39; this is the normal operating position, but when the friction plate is decelerated, the limit plate 36 takes a position illustrated by the dotted lines relative to the pin, and the ear 38 abuts against the pin, thus picking up the friction plate and preventing further relative rotational movement. There are three cam faces on the cam element 25 equally spaced, or in other words, 120° apart. Now, when the friction plate is decelerated, the cam element 25 is carried with it so that in the first 120° of movement of the cam element, the clutch is disengaged; rollers 18 now fall off of the cam surface 26, thus to again engage the clutch, and in the remaining 120° of relative movement, the rollers 18 ride up the next cam face to its crest and the clutch is again disengaged, and so remains disengaged as long as the pedal 61 is held depressed. During this time, there is a braking action on the friction material 31, yet the friction disc and cam element are carried with the driving parts of the clutch by reason of the limit plate 36, which drives the pin 40 through the ear 38.

During the clockwise deceleration of the friction plate 30, the spring 41 is placed under tension. When it is desired to now engage the clutch, the pedal 61 is released, and of course, the control plate 47 is retracted by the spring 50. The spring 41 now returns the friction plate so that the relative position of the stud 40 and limit plate 36 shift from the dotted line position in Fig. 10, to the full line position. This is a movement of substantially 240°. The packing springs 6 of the clutch are strong enough to move the cam element 25 with the friction plate 30 by forcing the rollers 18 to ride down the cam face 26 with which they are in contact, for a distance of approximately 120°, the cam element 25 and friction plate 30 move together in a counter-clockwise direction relative to the other parts of the clutch. At this time, however, the abrupt drops of the cams 26 strike the rollers 18, and further movement of the cam element 25 is prevented; the friction plate 30, however, must return its full distance of approximately 240°, and this is permitted by the ratchet action of the plungers 36, each of which moves out of its recess, slides over the face of the friction plate, and drops into the next adjacent recess.

Accordingly, it will be seen that the cam element 25 rotates relative to the clutch parts in the declutching operation to function twice, in that it disengages the clutch, engages the same, and disengages the clutch again, but in the action of engaging the clutch, it merely returns one-half of this distance so that the clutch is but once engaged, while the friction plate 30 has its relative movement equal in declutching and in clutching, namely, 240°.

It is to be understood that the invention is not limited to the idea of moving the parts 240° in declutching, and some of the parts 240° and 120°, respectively when clutching, as this comes about by reason of providing three clutch releasing levers and the corresponding number of cams for acting upon the same. A different number of releasing levers may be provided, and in this event, the full circle would not be divided into equal thirds of 120°, but would be divided into parts as determined by the number of levers utilized. However, three clutch operating members are thought to be advantageous.

In shifting gears, a driver depresses the pedal 61, and at this time, one hand grasps the gear shift lever 64; as soon as the clutch has been released, the driver is aware of the fact, due to the fact that the gears in the box 12 disengage easily. This permits of easy movement of the lever 64 so that when the clutch is disengaged, the lever 64 is moved to position the gears in neutral. With the lever thus in neutral, and the pedal 61 held depressed, the parts above described function to again throw in the clutch, thus to synchronize the gears in the gear case and then to automatically disengage the clutch, at which time the operator positions the gear shift lever 64 into the desired place for meshing of the gears. These actions all take place rather rapidly so that the gear shifting lever may be quickly moved from one position to another.

It will be noted that the torque of the engine is itself utilized to rotate the cam element 25 to thus disengage the clutch. To bring the torque into play, however, the operator merely supplies the reaction force by causing the retardation action on the friction plate 30. The friction plate 30 may be altered in design, as by means of changing the same in diameter, or providing more than one plate so that the reaction force may be made as light as desirable, even though the actual operation of the clutch requires considerable force.

The clutch facings 8, as is the case of all clutches, become worn in time, but it will be noted that considerable clearance is provided between the bottom faces of the cams on the cam element 25 and the rollers 18, as depicted in Fig. 1. Sufficient clearance is provided so that even though the clutch faces become badly worn, the levers 15 will be free to rock sufficiently to provide for full engagement of the clutch. Accordingly, the wearing of the clutch facings in no way affects the setting of the pedal 61. In course of time, the facing material 31 on the friction plate will wear; this, however, will result in requiring little further inward movement of the pedal 61, but does not affect its position of rest. A separate return spring may, if desired, be attached to the pedal 61, or its return may be dependent upon the springs 50 and 57, and also a suitable return stop may be provided, or the pedal may be simply allowed to return and abut against the toeboards.

It is advantageous that due to the fact that the engine torque is utilized to disengage the clutch, the primary engaging springs, or packing springs, such as the springs 6, can be made as strong as desired so that the clutch will have ample strength. It will be possible, therefore, to provide a clutch which runs in a bath of oil for giving a nicety of clutch action inasmuch as the springs can be made of any desired or requisite strength, and yet but light effort will be required to supply the reactive force in disengaging the clutch.

Figure 12:
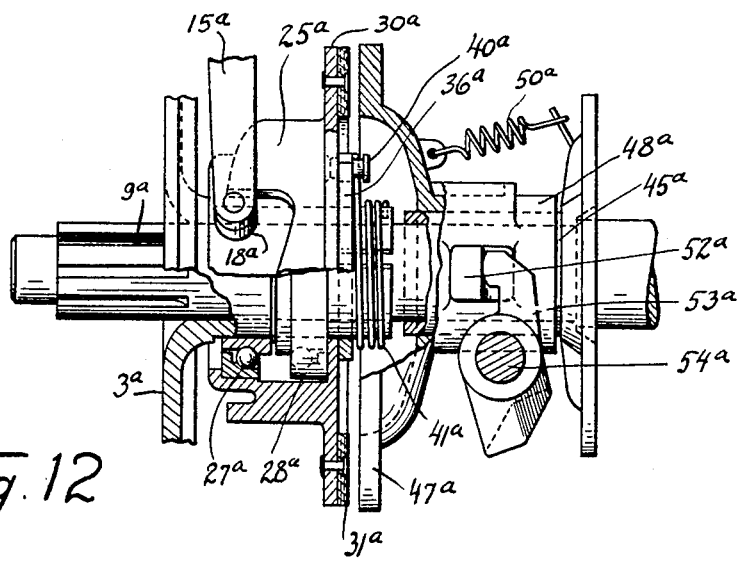
Fig. 12 is a view similar to Fig. 1 showing a modified arrangement.
Figure 13:
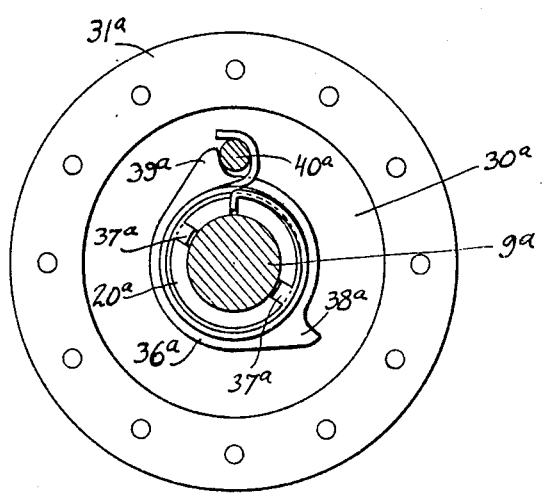
Fig. 13 is a view similar to Fig. 10 illustrating the limit plate as utilized in the modified arrangement.

The invention can be utilized for operating the clutch by means of the engine torque without also having the double clutch action. This modified arrangement is shown in Figs. 12 and 13 wherein the parts similar to the parts heretofore described have applied thereto the same reference characters which however are identified by a letter "a" thus to avoid the necessity of repetition of description. The particular characteristics of this modified arrangement is that the cam element 25a and the friction plate 30a are constructed so that they are not capable of relative rotational movement. They may be integral. The relative movement rotationally of these elements with respect to the levers 15a and other parts of the clutch is limited to 120 degrees, where 3 levers are employed. This is effected by stop plate 36a having ears 38a and 39a which permit the pin 40a to move only 120 degrees. Obviously this movement varies with the number of levers in the clutch.

In operation the controlling disc 47a frictionally engages facing material 31a decelerating the plate 30a and cam element 25a, and at the end of the decelerating motion pin 40a abuts ear 38a, at which time the rollers 18a are on a high point of the cam surface and the clutch is released. When the disc 47a is retracted, cam element 25a and plate 30a return to a normal position with stud 40a up against ear 39a. Similar to the previous described arrangement, this return movement may be effected by the coil spring 41a.

Claims:

1. In an automotive vehicle, the combination of an engine driven part, a second part for association with traction wheels, a clutch between these two parts, a shiftable gear transmission between these two parts for effecting various gear ratios between the same, said clutch being disengageable to permit shifting of gears, means operable to disengage the clutch to permit demeshing of gears, and means automatically acting independently of the operable means for engaging and again disengaging the clutch whereby to substantially synchronize certain of the gears to facilitate meshing thereof.

2. In a clutch, a driving part, a driven part, means for packing the parts together, a manually operable clutch controlling lever, and clutch actuating means acted upon by said lever for disengaging the driving and driven parts and for automatically re-engaging and again disengaging the same upon a single manual operation of the said lever, and stop means for automatically stopping the action of the clutch actuating means upon the second disengagement of the clutch.

3. In a clutch, the combination of driving and driven parts packed together, clutch releasing means including an element arranged to normally rotate with the clutch, and frictional means for effecting deceleration of said clutch releasing means to disengage the driving and driven members from their packed-together relation.

4. In a clutch, the combination of a driving part, a driven part, means for packing the parts together, clutch controlling means associated with the driving part to normally rotate therewith, and manually controlled means for effecting a reaction force to this rotary clutch controlling means to effect relative deceleration thereof whereby the torque of the driving part is utilized for effecting clutch disengagement.

5. A clutch comprising a driving part, a driven part, packing springs for packing the parts together in driving relation, an element associated with the driving clutch part and driven thereby and adapted to release the clutch by utilizing the torque of the driving part, and manually controlled means for exerting a reaction force on said element to bring the torque into play and release the clutch against the action of the packing springs.

6. In a clutch, driving and driven members, means for packing them together, means movable to relieve the packing pressure, an element arranged to normally rotate with the driving member having a cam associated with the said movable means, and manually controlled means for effecting relative rotational movement between said element and said movable means whereby to effect operable engagement of said cam and movable means for disengaging the clutch.

7. In a clutch, driving and driven parts arranged to be packed together in driving relation, movable means for relieving the packing pressure, a controlling element arranged to normally rotate with the clutch and having limited relative rotational movement as regards the driving part, cams on said element for actuating the movable pressure relieving means, manually controlled means for effecting said relative movement, said cams being sufficient in number to actuate the said movable means twice throughout the range of relative movement between the said element and the driving part of the clutch whereby the clutch is twice operated upon a single actuation of the manually controlled means.

8. In a clutch, driving and driven parts arranged to be packed together in driving relation, movable means for relieving the packing pressure, a controlling element arranged to normally rotate with the clutch and having limited relative rotational movement as regards the driving part, cams on said element for actuating the movable pressure relieving means, manually controlled means for effecting said relative movement, said cams being circumferentially arranged and spaced apart substantially one-half of the angular relative movement of which said element is capable whereby the clutch is twice operated upon a single actuation of the manually controlled means.

9. In a clutch, driving and driven parts arranged to be packed together, means movable to relieve the packing pressure, a rotary cam element for actuating the movable means, a friction disc, manually controlled means for applying friction thereto, said friction disc being capable of relative movement as regards the driving part but normally turning therewith, and means establishing a driving connection between the friction disc and cam element.

10. A clutch in accordance with claim 9 wherein the connection between the friction disc and cam element is a one-way drive connection.

11. A clutch in accordance with claim 9 wherein a plurality of circumferentially spaced cams are on the cam element, spaced apart one-half the distance of the relative rotational movement permitted between the friction disc and clutch driving part.

12. A clutch in accordance with claim 9 wherein the cam element is provided with three cams spaced 120° apart, and wherein the friction disc is capable of 240° relative movement as regards the driving part of the clutch.

13. A clutch in accordance with claim 9 wherein a resilient connection is provided between the friction disc and clutch driving part.

14. A clutch in accordance with clain 9 wherein a resilient connection is provided between the friction drive and clutch part which comprises a spring for holding the friction disc and driving part in normal operating position, but which is flexed upon the application of friction to the disc.

15. In a clutch, the combination of driving and driven parts arranged to be packed together, means for relieving the packing pressure comprising an element normally rotating with the driving part, but capable of rotational movement relative thereto, means actuated upon such relative movement for relieving the packing pressure, a controlling disc, and means operable to urge the controlling disc into engagement with said element to decelerate same as regards the driving part and relieve the clutch.

16. In a clutch, the combination of driving and driven parts arranged to be packed together, movable means for relieving the packing pressure, means for actuating the movable means and arranged to have a clearance with respect thereto to permit of change in position of the movable means in normal clutch operation as the clutch facings wear in use, and a control lever for said actuating means capable of having an initial adjustment for at rest position which is independent of the wear of the clutch facings.

In testimony whereof I affix my signature.

ERNEST E. WEMP.